(12) United States Patent
Shanai et al.

(10) Patent No.: US 9,376,596 B2
(45) Date of Patent: Jun. 28, 2016

(54) ADHESIVE FILM AND FLAT CABLE USING THE SAME

(71) Applicant: HITACHI CABLE, LTD., Tokyo (JP)

(72) Inventors: Daisuke Shanai, Hitachi (JP); Tomiya Abe, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 240 days.

(21) Appl. No.: 13/782,510

(22) Filed: Mar. 1, 2013

(65) Prior Publication Data

US 2013/0233590 A1 Sep. 12, 2013

(30) Foreign Application Priority Data

Mar. 9, 2012 (JP) .................................. 2012-053861

(51) Int. Cl.
*H01B 5/14* (2006.01)
*B32B 27/34* (2006.01)
(Continued)

(52) U.S. Cl.
CPC *C09J 7/02* (2013.01); *C09J 7/0239* (2013.01); *H01B 7/0823* (2013.01); *H01B 7/295* (2013.01); *C08K 3/0058* (2013.01); *C08K 5/0066* (2013.01); *C08K 5/29* (2013.01); *C08K 2003/2224* (2013.01); *C09J 2201/36* (2013.01); *C09J 2203/326* (2013.01); *C09J 2205/102* (2013.01); *C09J 2467/006* (2013.01); *C09J 2477/00* (2013.01); *Y10T 428/24959* (2015.01); *Y10T 428/264* (2015.01); *Y10T 428/2843* (2015.01)

(58) Field of Classification Search
CPC .......... B32B 27/06; B32B 27/18; B32B 27/36
USPC ........... 174/117 F; 428/212, 354, 355 R, 920, 428/921, 480
See application file for complete search history.

(56) References Cited

U.S. PATENT DOCUMENTS 3,914,150 A * 10/1975 Hill et al. .................... 156/308.6
3,914,379 A * 10/1975 Szarvasi ........................ 514/444
(Continued)

FOREIGN PATENT DOCUMENTS

| JP | 2001-222920 | * | 8/2001 | ............... H01B 7/08 |
| JP | 2004-031219 | * | 1/2004 | ............... H01B 3/42 |

(Continued)

OTHER PUBLICATIONS

Material Safty Data Sheet for Toluene MSDS No. BDH-180 Dec. 21, 2005.*

*Primary Examiner* — Michael F McAllister
(74) *Attorney, Agent, or Firm* — Paul D. Bianco; Fleit Gibbons Gutman Bongini & Bianco PL

(57) ABSTRACT

There is provided an adhesive film, comprising: an insulator film; an adhesive layer formed on the insulator film; and an intermediate adhesive layer interposed between the insulator film and the adhesive layer, wherein the intermediate adhesive layer is made of a mixed resin composition of a copolyamide being a crystalline resin solvable in a non-halogen based organic solvent and having a melting point of 100° C. or more and 150° C. or less, and a non-crystalline resin, and the intermediate adhesive layer contains a non-halogen flame retardant by 100 pts. wt. or more and 250 pts. wt. or less with respect to 100 pts. wt. of the mixed resin composition.

20 Claims, 2 Drawing Sheets

(51) Int. Cl.
*C09J 7/02* (2006.01)
*H01B 7/08* (2006.01)
*H01B 7/295* (2006.01)
*B32B 27/06* (2006.01)
*B32B 27/18* (2006.01)
*B32B 27/36* (2006.01)
*C08K 3/00* (2006.01)
*C08K 5/00* (2006.01)
*C08K 5/29* (2006.01)
*C08K 3/22* (2006.01)

(56) References Cited

U.S. PATENT DOCUMENTS

| | | | | |
|---|---|---|---|---|
| 5,389,724 A * | 2/1995 | LaFleur | ............... | C08L 29/04 525/221 |
| 5,523,137 A * | 6/1996 | Sei | ............... | C09J 7/0242 257/E21.516 |
| 6,136,915 A * | 10/2000 | Ohara | ............... | C08L 77/00 524/538 |
| 6,333,095 B1 * | 12/2001 | Ueno | ............... | C09J 7/0239 106/18.11 |
| 7,498,379 B2 * | 3/2009 | Kraemer | ............... | C07F 7/1836 524/588 |
| 2001/0038915 A1 * | 11/2001 | Tamura | ............... | H01F 5/06 428/375 |
| 2002/0170740 A1 * | 11/2002 | Yamanobe | ............... | H01B 7/0838 174/117 F |
| 2002/0195266 A1 * | 12/2002 | Yosomiya | ............... | 174/117 F |
| 2006/0127645 A1 * | 6/2006 | Imamura | ............... | H01B 3/18 428/170 |
| 2007/0059470 A1 * | 3/2007 | Husemann | ............... | B41F 30/04 428/40.1 |
| 2007/0264498 A1 * | 11/2007 | Shintani | ............... | C09J 7/0217 428/355 AC |
| 2008/0026246 A1 * | 1/2008 | Saga | ............... | B32B 15/08 428/626 |
| 2008/0057236 A1 | 3/2008 | Yamada | | |
| 2008/0241529 A1 * | 10/2008 | Bauer | ............... | C09J 9/00 428/355 R |

FOREIGN PATENT DOCUMENTS

| | | | | |
|---|---|---|---|---|
| JP | 2006-159901 | | 6/2006 | |
| JP | 2007-012349 | * | 1/2007 | ............ H01B 17/56 |
| JP | 2012-043746 | * | 3/2012 | ............ H01B 7/02 |

* cited by examiner

ADHESIVE FILM AND FLAT CABLE USING THE SAME

The present application is based on Japanese Patent Application, No. 2012-053861 filed on Mar. 9, 2012, the entire contents of which are hereby incorporated by reference.

TECHNICAL FIELD

The present invention relates to an adhesive film and a flat cable using the same.

DESCRIPTION OF RELATED ART

A flat cable is widely used as internal wiring cables of OA equipment such as a printer and a scanner, computer equipment, video equipment such as a flat-screen TV, audio equipment, and various electric and electronic equipment such as robots and an ultrasonic diagnostic device, etc.

As shown in FIG. 4A and FIG. 4B, a flat cable 110 is a cable in which a plurality of rectangular conductors 105 arranged in parallel are sandwiched by adhesive layers 104 of two adhesive films 101, having properties such as a thin thickness and excellent flexibility. As shown in FIG. 5, each adhesive film 101 used for the flat cable 110, has an insulator film 102 as a base material, and the adhesive layer 104 formed on the insulator film 102. In many cases, the adhesive layer 104 is produced by wet-coating the layer with an adhesive agent which is dissolved into a solvent and drying it thereafter. A film produced by Engineering Plastics Corporation having high heat resistance and high chemical resistance is used for the insulator film 102. Above all, a polyethylene terephthalate (PET) film having high market trading volume and satisfactory cost and high supply stability, is particularly preferably used. A surface of The PET film which is coated with the adhesive agent, is subjected to corona discharge processing or UV processing, to thereby improve an adhesion between the PET film and the adhesive agent.

As described above, since the flat cable is used as the internal wiring cable of the electronic equipment, the flat cable is requested to satisfy a UL standard, and a high flame resistance is also requested. In order to respond such a request, a high flame resistance is requested for the adhesive film used for the flat cable.

There are two methods as a method of applying flame resistance to the adhesive film. One of the methods is the method of making the insulator film itself inflammable. In this method, a film made of polyimide resin having a self-extinguishing property, is used as the insulator film. The other method is the method of making the adhesive layer inflammable. In this method, the flame resistance is applied to the adhesive layer by forming the adhesive layer with a flame retardant added to the adhesive agent. However, the method of making the insulator film itself inflammable is performed only for a special purpose of use, because the film made of polyimide resin is extremely expensive. Therefore, this method is not suitable for a case of making the adhesive film inflammable. Accordingly, when the adhesive film is made inflammable, a method of making the adhesion layer inflammable is used.

In a case of the method of making the adhesive layer inflammable, thermoplastic polyester resin particularly having high adhesiveness for adhesion to polyethylene terephthalate of the insulator film which is the base material, is widely used as base resin constituting the adhesive layer. The thermoplastic polyester resin includes two kinds of non-crystalline resin and crystalline resin.

The non-crystalline resin is speedily dissolved into a generally used organic solvent, and therefore is widely used as the resin for forming the adhesive layer of the flat cable used for a general purpose of use. However, the non-crystalline resin has a low heat resistance, and therefore is hardly used for the purpose of heat resistant use. As a method of improving the heat resistance of the non-crystalline resin, there is a method of adding a hardening agent to the resin, and introducing a bridge structure.

The crystalline resin has a high heat resistance, and can be used as an adhesive layer forming resin used for the flat cable for the purpose of heat resistance use. However, the crystalline resin is hardly dissolved into a generally used organic solvent, and therefore is used by dissolving it into a chlorine-based organic solvent such as methyl chlorides. Further, as a method of forming the adhesive layer without using the organic solvent, there is a method of thinly extruding the crystalline resin by an extruder, and forming the adhesive layer.

Also, as a related technique, there is proposed a method of adding the crystalline resin to the non-crystalline resin (for example, see patent document 1).

Patent Document 1:

Japanese Patent Laid Open Publication No. 2006-159901

However, in the method of adding the hardening agent to the non-crystalline resin constituting the adhesive layer, and applying the heat resistance to the adhesive layer, it is difficult to obtain a great effect in terms of the heat resistance, compared with a case of using the crystalline resin. Namely, if an addition amount of the hardening agent is small, and introduction of the bridge structure to the adhesive layer is small, sufficient heat resistance cannot be applied to the adhesive layer. Meanwhile, if the addition amount of the hardening agent is increased and the bridge structure is introduced to the adhesive layer to improve the heat resistance, hot-melt of the adhesive layer hardly occurs during production of the flat cable, and a sufficient adhesion force cannot be obtained.

Further, when the crystalline resin having the heat resistance is used, the crystalline resin is required to be dissolved into the chlorine-based organic solvent such as methyl chlorides, thus posing a problem of an adverse influence on a human body and an environment. Further, when the crystalline resin is extruded to thereby form the adhesive layer, the resin containing the flame retardant, etc., has a high melt viscosity, thus making it difficult to be uniformly thinly extruded. In addition, when the resin is extruded to form the adhesive layer, a large-scale facility is required, and therefore a manufacturing cost is likely to be increased compared with a wet coating.

Further, curl or warpage of the insulator film as the base material is generated in some cases, when the film is coated with the crystalline resin as the adhesive agent, and is dried thereafter. As shown in FIG. 6, since the crystalline resin contained in the adhesive layer 104 has a large shrink ratio due to crystallization, and therefore is largely shrunk with respect to the insulator film 102. As a result, the insulator film 102 is curled to become the adhesive film 101 in a curled state. Therefore, when the flat cable is produced using this adhesive film 101, the curl is generated, thus producing a poor outer appearance.

Further, conventionally, a primer layer is required in some cases, between the insulator film and the adhesive layer. The primer layer is a thin layer for improving the adhesion between the insulator film and the adhesive layer. However, the adhesion is lowered, and therefore the flame retardant cannot be added. Therefore, when the primer layer is provided, there is a problem that the flame resistance is also lowered in the primer layer.

In view of the above-described problem, the present invention is provided, and an object of the present invention is to provide the adhesive film not containing halogen, having high heat resistance and flame resistance, and capable of suppressing the curl, and to provide the flat cable capable with suppressed curl and good outer appearance.

SUMMARY OF THE INVENTION

According to a first aspect of the present invention, there is provided an adhesive film, including:

an insulator film;

an adhesive layer formed on the insulator film; and an intermediate adhesive layer interposed between the insulator film and the adhesive layer, wherein the intermediate adhesive layer is made of a mixed resin composition of a copolyamide being a crystalline resin solvable in a non-halogen based organic solvent and having a melting point of 100° C. or more and 150° C. or less, and a non-crystalline resin, and the intermediate adhesive layer contains a non-halogen flame retardant by 100 pts.wt. or more and 250 pts.wt. or less with respect to 100 pts.wt. of the mixed resin composition.

DETAILED DESCRIPTION OF THE INVENTION

Figure 1:
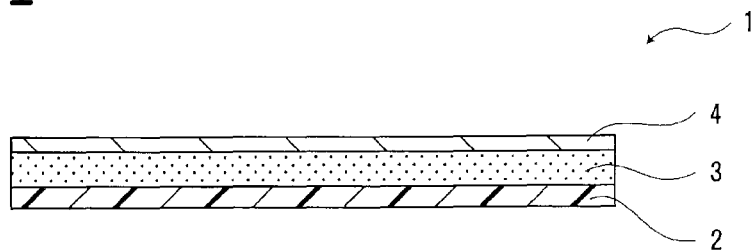
FIG. 1 is a cross-sectional view of an adhesive film according to an embodiment of the present invention.
Figure 2:
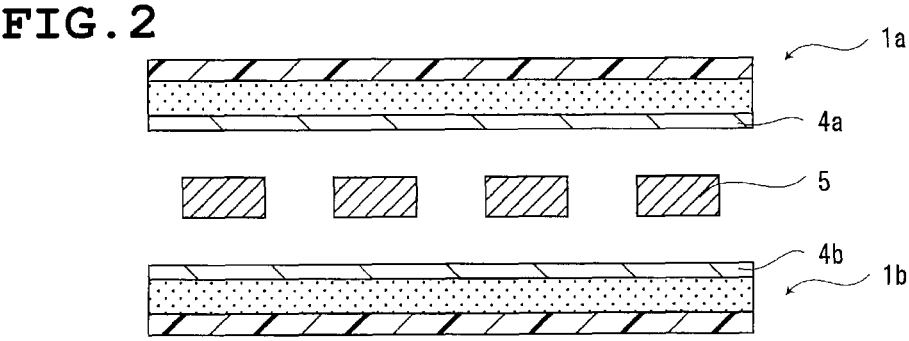
FIG. 2 is a view showing one step of a method of manufacturing a flat cable according to an embodiment of the present invention.
Figure 3:
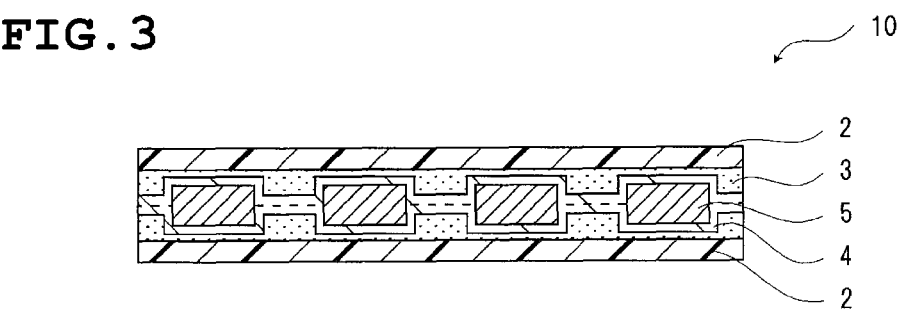
FIG. 3 is a cross-sectional view of the flat cable according to an embodiment of the present invention.
Figure 4A:
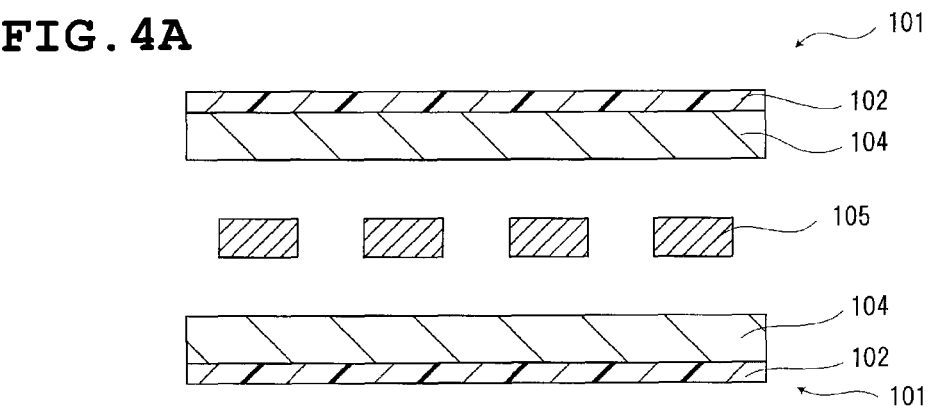
FIG. 4A is a step view in a conventional method of manufacturing a flat cable.
Figure 4B:
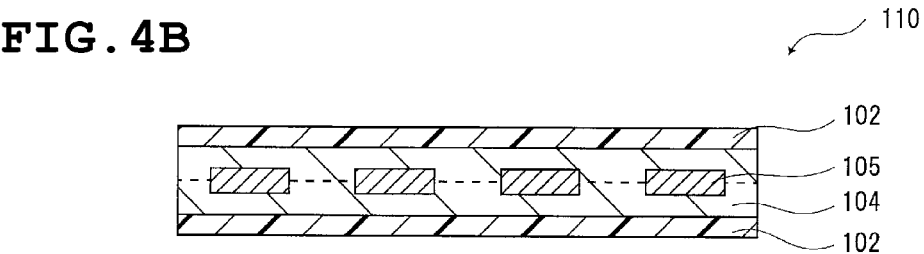
FIG. 4B is a step view in the conventional method of manufacturing a flat cable.
Figure 5:
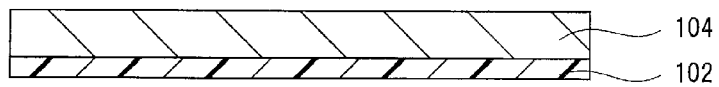
FIG. 5 is a cross-sectional view of a conventional adhesive film.
Figure 6:
FIG. 6 is a view describing a curl (warpage) of the conventional adhesive film.

Embodiments of an adhesive film according to the present invention will be described hereafter, using the drawings. FIG. 1 is a cross-sectional view of the adhesive film according to an embodiment of the present invention. FIG. 2 is a view showing one step of a method of manufacturing a flat cable according to an embodiment of the present invention. FIG. 3 is a cross-sectional view of the flat cable according to an embodiment of the present invention.

(Adhesive film)

The method of manufacturing the adhesive film of this embodiment includes:

dissolving a copolyamide being a crystalline resin and a non-crystalline resin into a non-halogen organic solvent, and adding a flame retardant thereto, to thereby prepare a coating liquid of an intermediate adhesive layer;

coating an insulator film 2 with the coating liquid of the intermediate layer, and drying the insulator film 2, to thereby form an intermediate adhesive layer 3 comprising a mixed resin composition of the crystalline resin and the non-crystalline resin;

dissolving a resin constituting an adhesive layer 4 into a non-halogen organic solvent, to thereby prepare a coating liquid of an adhesive layer; and coating the intermediate adhesive layer 3 with the coating liquid of the adhesive layer, and drying this intermediate adhesive layer 3 thereafter, to thereby form the adhesive layer 4.

First, the insulator film 2 is prepared.

The insulator film 2 is a base material of the adhesive film 1, and is a member positioned on an outermost surface covering conductors 5 in a flat cable 10. Each kind of film produced by Engineering Plastics Corporation having high heat resistance and high chemical resistance, can be used as the insulator film 2. Above all, a polyethylene terephthalate (PET) film having high market trading volume and satisfactory cost and high supply stability, can be particularly preferably used. Preferably, the insulator film 2 has a thickness of 9 µm or more and 35 µm or less. If the thickness is smaller than 9 µm, the heat resistance of the adhesive film 1 is insufficient. Meanwhile, if the thickness is larger than 35 µm, softness cannot be obtained, thus producing a poor bendability. Further, in a PET film, larger thickness induces a low flame retardant effect, thus producing an easily flammable film. A surface of The PET film which coated with the adhesive agent (coating liquid), is subjected to corona discharge processing or UV processing, to thereby improve an adhesion to the adhesive agent.

Subsequently, the coating liquid of the intermediate adhesive layer is prepared. A copolyamide being a crystalline resin, and a non-crystalline polymer are used as a resin constituting the intermediate adhesive layer 3. These resins are dissolved into the non-halogen organic solvent and a flame retardant are added thereto, to thereby prepare the coating liquid of the intermediate adhesive layer. In this embodiment, a substance solvable in the non-halogen based organic solvent and having a melting point of 100° C. or more and 150° C. or less is used as the copolyamide.

The copolyamide being the crystalline resin and the non-crystalline resin constituting the intermediate adhesive layer 3, and the organic solvent for dissolving these resins, will be described here.

The crystalline resin has a region where polymers are arranged regularly, and has an excellent heat resistance in a temperature zone lower than the melting point. Further, the crystalline resin has an extremely high crystal cohesion, and has a high chemical resistance (solvent resistance). However, a shrink ratio due to drying is high, due to such a high crystal cohesion. In addition, the crystalline resin is hardly dissolved in the generally used organic solvent (for example, the non-halogen based organic solvent not containing halogen), due to its chemical resistance, and the halogen-based organic solvent is required for dissolving the crystalline resin.

Meanwhile, the non-crystalline resin has a region where the polymers are not arranged regularly, and has a low heat resistance. Further, there is no regularity in a molecular sequence, the crystal cohesion is low, and the solvent resistance is also low. However, the crystal cohesion is low, and the shrink ratio due to drying is small. In addition, since the solvent resistance is low, the non-crystalline resin is easily solvable in the non-halogen based organic solvent.

As described above, although the crystalline resin is excellent in terms of the heat resistance compared with the non-crystalline resin, the shrink ratio due to drying is high, and is hardly dissolved in the generally used organic solvent. Crystalline polyethylene, nylon, polyester, and copolyamide, etc., can be given as the crystalline resin. Above all, crystalline polyethylene, nylon, and polyester are hardly dissolved in the non-halogen based organic solvent, and are required to be dissolved in a specific organic solvent containing halogen. Meanwhile, the copolyamide shows solubility to the non-halogen based organic solvent. Therefore, in this embodiment, in order to reduce an influence on the human body or the environment by not using the organic solvent containing halogen, the copolyamide as the crystalline resin is used.

The copolyamide is generated by dehydration condensation between a dicarbon acid component and a diamine component. The copolyamide used in this embodiment, is synthesized from, for example, dicarbon acid containing polymerization fatty acid (a part or the whole part of the dicarbon acid is composed of the polymerization fatty acid), diamine, and diol. The copolyamide preferably contains in a molecular structure dimerized polymerization fatty acid of carbon number 36 or 44 which is obtained by dimerizing the fatty acid. The copolyamide has a large carbon number and has an amide bond with high polarity. Therefore, flexibility and high adhesiveness can be obtained.

Further, preferably the copolyamide being the crystalline resin has a crystal heat of fusion of 5 J/g to 35 J/g measured by a differential thermal analysis. By using the copolyamide being the crystalline resin, a coating liquid having extremely high heat resistance and satisfactory solubility into a solvent and high concentration, can be obtained.

Further, the copolyamide having the melting point of 100° C. or more and 150° C. or less is used. If the melting point is lower than 100° C., it is difficult to sufficiently obtain the heat resistance of the formed intermediate layer. Meanwhile, if the melting point is higher than 150° C., a laminate temperature for manufacturing the flat cable is excessively high, thus involving a problem of deforming the insulator film by heat. Further, in the copolyamide having the melting point higher than 150° C., solubility into the non-halogen based organic solvent is reduced. Therefore, the melting point of the copolyamide is preferably set to 110° C. or more and 140° C. or less.

As described above, although the non-crystalline resin is inferior to the crystalline resin in terms of the heat resistance, it has an advantage that the shrink ratio due to drying is small. Moreover, it can be easily dissolved in the organic solvent in which the copolyamide being the crystalline resin is dissolved. Since the non-crystalline resin is mixed with the copolyamide being the crystalline resin, the shrink of the intermediate layer by drying can be suppressed.

The non-crystalline resin is not particularly limited, provided that it is non-crystalline. For example, non-crystalline polyester, non-crystalline polyamide, non-crystalline polyurethane, or non-crystalline rubber, etc., can be used.

Thus, in this embodiment, the copolyamide being the crystalline resin and a mixed resin composition made of the non-crystalline resin having different properties are used as the resin constituting the intermediate adhesive layer.

In the mixed resin composition, a mixing ratio of the crystalline resin and the non-crystalline resin is preferably in a range of 10 pts.wt. or more and 80 pts.wt. or less of the non-crystalline resin, with respect to 100 pts.wt. of the crystalline resin. If the non-crystalline resin is in a range of 10 pts.wt. or more and 80 pts.wt. or less, a high effect of reducing the shrink ratio due to drying can be obtained, and the curl of the adhesive film can be surely suppressed, and a high heat resistance can be secured.

The non-halogen based organic solvent not allowing halogen to be remained in the intermediate adhesive layer 3, is used as the organic solvent for dissolving the resin therein. The non-halogen based organic solvent is not particularly limited, if the copolyamide being the crystalline resin can be dissolved therein. When using a solvent for dissolving the crystalline resin therein, the non-crystalline resin can also be easily dissolved. The non-halogen based organic solvent preferably has a boiling point of 140° C. or less at a room temperature. The intermediate adhesive layer 3 is formed in such a way that the insulator film 2 is coated with the coating liquid of the intermediate adhesive layer, and the coating liquid is dried thereafter, to thereby remove the organic solvent. The coating liquid is dried at a temperature of the boiling point or more of the organic solvent. However, if the boiling point of the used organic solvent is higher than 140° C., drying time is prolonged, thus involving a problem that the insulator film is deformed by heat.

As the non-halogen based organic solvent, for example, a mixed solvent of a hydrocarbon solvent (nonpolar solvent) such as toluene or methylcyclohexane, alcohols (polar solvent) such as methanol, ethanol, isopropyl alcohol, or n-propanol, is preferably used. This is because by mixing the hydrocarbon solvent and the alcohols which show almost no solubility singularly to the copolyamide being the crystalline resin, the solubility of the resin can be improved. The mixing ratio of the mixed solvent can be set in the following range for example: "toluene:alcohols=95:5 to 10:90", "methylcyclohexane:n-propanol=60:40 to 20:80".

The flame retardant is added into the coating liquid of the intermediate adhesive layer, and in this case, a non-halogen flame retardant not containing halogen, is added. An addition amount is as follows: 100 pts.wt. or more and 250 pts.wt. or less of the flame retardant is added, with respect to 100 pts.wt. of the mixed resin composition of the crystalline resin and the non-crystalline resin. If the addition amount is smaller than 100 pts.wt, it is difficult to sufficiently obtain the flame resistance of the adhesive film. Meanwhile, if the addition amount is more than 250 pts.wt, it is difficult to sufficiently maintain an adhesion force between the insulator film and the adhesive layer, and the intermediate layer.

Further, as the non-halogen flame retardant, a phosphorus compound, a nitrogen compound, and a metal compound can be used. As the phosphorus compound, metal phosphate, phosphate, melamine polyphosphate, ammonium polyphosphate, phosphate ester, condensation phosphate, and a phosphazene compound can be used. Further, as the nitrogen compound, melamine sulfate, a guanidine compound, a melamine compound, and 1,3,5-triazine derivative can be used. Further, as the metal compound, magnesium hydroxide, aluminum hydroxide, zinc stannate, hydoroxy zinc stannate, zinc borate, calcium borate, and zinc sulfate can be used. These non-halogen flame retardants may be used alone or in a combination of two kinds or more compounds.

Further, a carbodiimide compound is preferably added into the coating liquid of the intermediate adhesive layer. The carbodiimide compound is a compound having at least two carbodiimide groups (—N=C=N—) in one molecule. The carbodiimide compound is capable of causing a reaction between the copolyamide of the formed intermediate adhesive layer and active hydrogen of the insulator film, to thereby improve the adhesion force.

As the carbodiimide compound, a compound solvable in the organic solvent for dissolving the copolyamide being the crystalline resin therein, can be used. For example, a carbodiimide based compound and a derivative having a framework of the carbodiimide based compound obtained by synthesizing diisopropyl carbodiimide, dicyclohexyl carbodiimide, 1-ethyl-3-(3-dimethylaminopropyl) carbodiimide hydrochloride, N-[3-(dimethylamino)propyl]-N'-ethylcarbodiimide,N,N'-di-p-tolylcarbodiimide, or hexamethylene diisocyanate or 4,4'-diphenylmethane diisocyanate by the above-mentioned method, can be given as such a carbodiimide compound.

The addition amount of the carbodiimide compound is preferably 2.5 pts.wt. or more and 15 pts.wt. or less, and more preferably 5 pts.wt. or more and 10 pts.wt. or less, with respect to 100 pts.wt. of the mixed resin composition. If the addition amount of the carbodiimide compound is smaller than 2.5 pts.wt, it is difficult to sufficiently improve the adhesiveness between the intermediate adhesive layer and the insulator film. Meanwhile, if the addition amount of the carbodiimide compound is more than 15 pts.wt, the adhesiveness is further reduced.

Subsequently, the insulator film 2 is coated with the coating liquid of the intermediate adhesive layer, and the coating liquid is dried thereafter, to thereby form the intermediate layer 3.

The intermediate adhesive layer 3 is interposed between the insulator film 2 and the adhesive layer 4, which becomes a resin layer having the heat resistance and the flame resistance. The intermediate adhesive layer 3 is composed of a mixed resin composition which is solvable in the non-halogen based organic solvent, in which halogen is not remained. Although shrink is generated in the intermediate adhesive layer 3 by drying, stress due to shrink is relaxed, because the non-crystalline resin is introduced to the copolyamide being the crystalline resin. As a result, generation of the curl is suppressed in the insulator film 2. Note that relatively small content of non-crystalline resin is dispersed in the intermediate adhesive layer 3, compared with the copolyamide which is a large content of crystalline resin, thus forming a dispersed phase.

A thickness of the intermediate adhesive layer 3 is preferably larger than a thickness of the insulator film 2. If the thickness of the intermediate adhesive layer 3 is smaller than the thickness of the insulator film 2, it is difficult to obtain the flame resistance as the adhesive film. The thickness of the intermediate adhesive layer 3 is preferably set to 13 μm or more for example.

Subsequently, the resin constituting the adhesive layer 4 is dissolved in the non-halogen organic solvent, to thereby examine the coating liquid of the adhesive layer.

The resin constituting the adhesive layer 4 is not particularly limited, if the resin is solvable in the non-halogen based organic solvent, and non-crystalline thermoplastic polyurethane, non-crystalline polyester, crystalline or non-crystalline copolyamide, can be used as the resin constituting the adhesive layer 4. When rectangular conductors are coated with the adhesive film of the present invention to thereby form the flat cable, these resins have excellent adhesiveness for adhesion to copper and tin-plated copper. Above all, non-crystalline polyester having excellent solubility in the solvent and excellent adhesiveness for adhesion to conductors can be suitably used.

Further, the resin solvable in the non-halogen based organic solvent having a boiling point of 120° C. or less is preferably used. The resin constituting the adhesive layer 4 is dissolved in the organic solvent, and is prepared as the coating liquid of the adhesive layer, to coat the intermediate adhesive layer 3. Thereafter, the coating liquid of the adhesive layer is dried and the solvent is removed, to thereby form the adhesive layer 4. In this process, the organic solvent is dried at a boiling point or more. However, if the boiling point of the used organic solvent is higher than 120° C., the drying time is prolonged, thus involving a problem that the deformation is generated in the intermediate adhesive layer 3 which is a ground layer or the insulator film 2 which is the base material.

Therefore, as the resin used for the adhesive layer 4, the resin solvable in the non-halogen based organic solvent with a boiling point of 120° C. or less is preferably used. Note that as the non-halogen based organic solvent with a boiling point of 120° C. or less, toluene, cyclohexane, methylcyclohexane, methylethyl ketone, acetone, ethyl acetate, n-propyl alcohol, isopropyl alcohol, methanol, and ethanol can be used. These organic solvents may be used alone or may be used by mixture.

The adhesive layer 4 may contain the non-halogen flame retardant, similarly to the intermediate adhesive layer 3. As the kind of the non-halogen flame retardant, the flame retardant same as that used for the intermediate adhesive layer can be used.

Further, the content of the flame retardant in the adhesive layer 4 is preferably smaller than the content of the intermediate adhesive layer 3. As shown in FIG. 3, in the flat cable 10, the adhesive layer 4 is adhered to the conductors 5 and is positioned more inward than the intermediate adhesive layer 3 having the heat resistance and the flame resistance. Namely, the adhesive layer 4 is protected by the intermediate adhesive layer 3, and therefore high flame resistance is not required for the adhesive layer 4. Accordingly, in the adhesive layer 4, the adhesiveness for adhesion to the conductors 5 can be improved by reducing the content of the flame retardant. Therefore, the content of the non-halogen flame retardant contained in the adhesive layer 4 is preferably 5 pts.wt. or more and 100 pts.wt. or less, with respect to 100 pts.wt. of the resin constituting the adhesive layer 4. If the content of the non-halogen flame retardant is smaller than 5 pts.wt, it is difficult to sufficiently obtain the flame resistance of the adhesive layer 4. However, this is not applied to a case that a sufficient flame resistance is given to the intermediate adhesive layer 3. Meanwhile, if the content of the non-halogen flame retardant is more than 100 pts.wt, it is difficult to sufficiently obtain the adhesion force of the adhesive layer 4 for adhesion to the conductors 5.

Subsequently, the intermediate adhesive layer 3 is coated with the coating liquid of the adhesive layer, and the coating liquid is dried so that the adhesive layer 4 is formed, to thereby obtain the adhesive film 1 of this embodiment.

The adhesive layer 4 is a resin layer formed on the intermediate adhesive layer 3, adhered to the conductors 5 in the flat cable 10, and is a member positioned more inward than the intermediate adhesive layer 3. Preferably, the formed adhesive layer 4 has a thickness smaller than the thickness of the insulator film 2. If the thickness is larger than the thickness of the insulator film 2, it is difficult to obtain the flame resistance as the adhesive film 1. The thickness of the adhesive layer 1 is preferably set to 18 μm or more and 45 μm or less, when the thickness of the insulator film 2 is set to 12 μm.

In the adhesive film of this embodiment, the intermediate adhesive layer is interposed between the insulator film and the adhesive layer. Namely, the adhesive layer in a conventional adhesive film has a two-layer structure of the intermediate adhesive layer and the adhesive layer. In addition, the intermediate adhesive layer is composed of the mixed resin composition of the copolyamide being the crystalline resin and the non-crystalline resin. In the intermediate adhesive layer containing the crystalline resin and the non-crystalline resin having this structure, although the crystalline resin is largely shrunk by crystallization during drying, the stress due to the shrink is dispersed and relaxed by the mixed non-crystalline resin, to thereby suppress excessive shrink of the intermediate adhesive layer. As a result, the curl of the adhesive film is suppressed by suppressing the shrink of the intermediate adhesive layer.

Further, in the adhesive film of this embodiment, the intermediate adhesive layer contains the copolyamide being the crystalline resin with a boiling point of 100° C. or more and 150° C. or less, and therefore the heat resistance is excellent. In addition, the copolyamide is solvable in the non-halogen based organic solvent, and therefore halogen is not remained in the intermediate adhesive layer.

Further, the adhesive film of this embodiment has a two-layer structure of the intermediate adhesive layer positioned outside and the adhesive layer positioned more inward than the intermediate adhesive layer so as to be coated and protected by the intermediate adhesive layer. According to this structure, the content of the flame retardant contained in the intermediate adhesive layer and the adhesive layer can be changed. Namely, a prescribed amount of the flame retardant is contained in the intermediate adhesive layer which is required to have a high flame resistance, and meanwhile the content of the flame retardant can be reduced in the adhesive layer which is not required to have a high flame resistance compared with the intermediate adhesive layer. Then, the adhesiveness of the adhesive layer can be improved, as the content of the flame retardant is reduced. Namely, according to the adhesive film of this embodiment, the content of the flame retardant in the adhesive layer is not limited, and therefore the adhesiveness of the adhesive layer can be improved by reducing the content.

Further, the adhesive film of this embodiment contains the non-halogen flame retardant as the flame retardant, and therefore does not contain halogen.

Thus, according to the structure of this embodiment, the adhesive film not containing halogen, having excellent heat resistance, flame resistance, and adhesiveness, with the curl suppressed, can be provided.

In the above-mentioned embodiment, preferably thickness Ta of the insulator film, thickness Tb of the adhesive layer, and thickness Tc of the intermediate adhesive layer satisfy a relation of Tc>Ta>Tb. If the thickness Tc of the intermediate adhesive layer is excessively small, it is difficult to sufficiently relax the stress due to the shrink, and the heat resistance and the flame resistance are reduced.

In this embodiment, an antioxidant, a copper inhibitor, an antiblocking agent, a colorant, a thickner, a crosslinking agent, a crosslinking aid, an antistatic agent, an ultraviolet absorber, a photostabilizer, and a hydrolysis inhibitor can be suitably added to the adhesive layer and the intermediate adhesive layer. Further, in the present invention, the adhesiveness between the insulator film and the adhesive layer is improved by the intermediate adhesive layer. Therefore, a primer layer which is conventionally required for improving the adhesiveness, is not required.

(Flat cable)

The flat cable according to an embodiment of the present invention will be described next. As shown in FIG. 2 and FIG. 3, the flat cable 10 is configured so that a pair of adhesive films 1a, 1b obtained as described above are formed integrally with the adhesive layers 4a, 4b, and the conductors 5, with the adhesive layers 4a, 4b opposed to each other and the conductors 5 interposed between them. The adhesive layers 4a, 4b are integrally formed by fixing them by lamination, etc.

In the flat cable of this embodiment, a pair of horizontal adhesive films with curl suppressed are integrally formed by being stuck to each other, with conductors interposed between them. Therefore, the flat cable is excellent in outer appearance, with curl suppressed.

EXAMPLES

The adhesive film and the flat cable according to an example of the present invention were produced using the following method and conditions. This is absolutely an example of the adhesive film and the flat cable according to the present invention, and the present invention is not limited to these examples.

First, the coating liquid of the intermediate adhesive layer was prepared. The copolyamide being the crystalline resin (TPAE31 having a melting point of 114° C. and produced by Fujikasei Kogyo), and the copolyamide of the non-crystalline resin (TPAE617 without the melting point and produced by Fujikasei Kogyo), were used for the resin (base resin) constituting the intermediate adhesive layer. 90 pts.wt. of TPAE31 and 10 pts.wt. of TPAE617 were mixed, and the mixed resin composition (total:100 pts.wt.) was dissolved into a mixed solvent of toluene and isopropyl alcohol (toluene:isopropyl alcohol=60:40). Further, 100 pts.wt. of metal phosphate (Exolit OP935, produced by Clariant) being the non-halogen flame retardant, and 5 pts.wt. of carbodiimide compound (V-03, produced by Nisshinbo Chemical) were added into the mixed solvent, to thereby prepare the coating liquid (adhesive agent 1) of the composition 1 of the intermediate adhesive layer shown in table 1. TPAE31 was used as the copolyamide being the crystalline resin, and a crystal melting calorific value of TPAE31 was in a range of 5 J/g to 35 J/g. Further, TPAE617 was used as the non-crystalline resin, and the crystal melting calorific value of TPAE617 was 0 J/g. The crystal melting calorific value was measured at a rate of temperature rise set to 10° C./min and in a dry nitrogen atmosphere, using a Differential Scanning calorimetry (DSC) (Q200: produced by TA Instruments Japan).

TABLE 1

| | | C1 | C2 | C3 | C4 | C5 | C6 | C7 | C8 | C9 | C10 | C11 | C12 | C13 | C14 | C15 | C16 | C17 | C18 |
|---|---|---|---|---|---|---|---|---|---|---|---|---|---|---|---|---|---|---|---|
| Resin [pts. wt.] | Crystalline copolyamide | | | | | | | | | | | | | | | | | | |
| | TPAE31 (Melting point 114° C.) | 90 | 80 | 70 | 60 | — | — | — | — | — | — | — | — | — | — | — | — | 95 | 55 |
| | TPAE32 (Melting point 124° C.) | — | — | — | — | 90 | 80 | 70 | 60 | — | — | — | — | — | — | — | — | — | — |
| | TPAE33 (Melting point 106° C.) | — | — | — | — | — | — | — | — | 90 | 80 | 70 | 60 | — | — | — | — | — | — |
| | PA102A (Melting point 146° C.) | — | — | — | — | — | — | — | — | — | — | — | — | 90 | 80 | 70 | 60 | — | — |
| | Non-crystalline copolyamide | | | | | | | | | | | | | | | | | | |
| | TPAE617 (Without melting point) | 10 | — | — | — | — | — | — | 40 | 10 | — | — | — | 10 | — | — | — | 5 | — |
| | TPAE617C (Without melting point) | — | 20 | 30 | — | — | 20 | 30 | — | — | 20 | 30 | — | — | 20 | 30 | — | — | 45 |
| | Non-crystalline polyester | | | | | | | | | | | | | | | | | | |
| | ELITEL UE3500 (Without melting point) | — | — | — | 40 | 10 | — | — | — | — | — | — | 40 | — | — | — | 40 | — | — |
| | VYLON200 (Without melting point) | | | | | | | | | | | | | | | | | | |
| Flame resistance [pts. wt.] | Metal phosphate | | | | | | | | | | | | | | | | | | |
| | Exolit OP935 | 100 | 150 | 200 | 250 | 100 | 150 | 200 | 250 | — | — | — | 150 | 150 | 150 | 150 | 150 | 150 | 150 |
| | FP2100J | — | — | — | — | — | — | — | — | 150 | 200 | 250 | 50 | — | — | — | — | — | — |
| | Phosphate 1,3,5-triazine derivative | | | | | | | | | | | | | | | | | | |
| | MC-5S | — | — | — | — | — | — | — | — | — | — | — | — | 50 | — | — | — | — | — |
| | Calcium borate | | | | | | | | | | | | | | | | | | |
| | UBP | — | — | — | — | — | — | — | — | — | — | — | — | — | 50 | — | — | — | — |
| | ALCANEX ZS | — | — | — | — | — | — | — | — | — | — | — | — | — | — | 50 | — | — | — |
| | Magnesium hydroxide | | | | | | | | | | | | | | | | | | |
| | KISUMA5L | — | — | — | — | — | — | — | — | — | — | — | — | — | — | — | 50 | — | — |
| | Aluminum hydroxide | | | | | | | | | | | | | | | | | | |
| | HIGILITE H-42S | — | — | — | — | — | — | — | — | — | — | — | — | — | — | — | — | — | — |
| Addition agent [pts. wt.] | Carbodiimide | | | | | | | | | | | | | | | | | | |
| | V-03 | 5 | 10 | 5 | 10 | — | — | — | 5 | — | — | — | 5 | — | — | — | 10 | 1 | 15 |
| | V-05 | — | — | — | — | 5 | 5 | 5 | — | 5 | — | 10 | — | 5 | 5 | 5 | — | — | — |
| | V-07 | — | — | — | — | — | — | — | — | — | 10 | 80 | — | — | — | — | — | — | — |
| | V-09 | — | — | — | — | — | — | — | — | — | — | — | — | — | — | — | — | — | — |
| Organic solvent [ratio] | Hydrocarbon solvent | | | | | | | | | | | | | | | | | | |
| | Toluene | 60 | 70 | 80 | 85 | 70 | 90 | 50 | 50 | 50 | 60 | 80 | 80 | 50 | 60 | 80 | 80 | 80 | 60 |
| | Alcohol | | | | | | | | | | | | | | | | | | |
| | Isopropyl Alcohol | 40 | — | 20 | 15 | — | 10 | 50 | 50 | 50 | 40 | 20 | — | — | — | — | 20 | 20 | 40 |
| | Ethanol | — | 30 | — | — | 30 | — | — | — | 50 | — | — | 20 | 50 | 40 | — | — | — | — |
| | Methanol | — | — | — | — | — | — | — | — | — | — | — | — | — | — | — | — | — | — |
| Property evaluation | Solvent solubility | Exc. | Exc. | Exc. | Exc. | Exc. | Exc. | Exc. | Exc. | Exc. | Exc. | Exc. | Exc. | Exc. | Exc. | Exc. | Exc. | Exc. | Exc. |
| | Heat resistance | Pass | Pass | Pass | Pass | Pass | Pass | Pass | Pass | Pass | Pass | Pass | Pass | Pass | Pass | Pass | Pass | Pass | Pass |
| | Curl | Pass | Pass | Pass | Pass | Pass | Pass | Pass | Pass | Pass | Pass | Pass | Pass | Pass | Pass | Pass | Pass | Pass | Pass |

C = Composition
Exc. = Excellent

Further, similarly to the adhesive agent 1, coating liquids having compositions 2 to 18 shown in table 1 (adhesive agents 2 to 18) were prepared. In the adhesive agents 2 to 18, the kind and the addition amount of the crystalline resin and the non-crystalline resin, the kind and the addition amount of the flame resistance, the kind of the carbodiimide compound as the addition agent, and the mixing ratio of the hydrocarbon based solvent and alcohol, etc., are suitably changed.

As the crystalline resin, the copolyamide having the crystal melting calorific value in a range of 5 J/g to 35 J/g measured by DSC, is used, and TPAE32 (having a melting point of 124° C.), TPAE33 (having a melting point of 106° C.), PA102A (having a melting point of 146° C.) (produced by Fujikasei Kogyo) were used other than TPAE31 (having a melting point of 114° C.) used in example 1.

As the non-crystalline resin, the resin having a crystal melting calorific value of 0 J/g measured by DSC is used, and the copolyamide such as TPAE617C (without melting point and produced by Fujikasei Kogyo), ELITEL UE3500 made of polyester (without melting point and produced by UNITIKA), and VYLON 200 (without melting point and produced by TOYOBO) were used, other than TPAE617 (without melting point) used in example 1.

As the flame retardant, phosphate (FP2100J produced by ADEKA), 1,3,5-triazine derivative (MC-5S produced by SAKAI CHEMICAL INDUSTRY CO., LTD. Calcium borate (UBP produced by KINSEI MATEC CO., LTD.), zinc stannate (ALCANEX ZS produced by MIZUSAWA INDUSTRIAL CHEMICALS, LTD.), magnesium hydroxide (KISUMA 5L produced by KYOWA CHEMICAL INDUSTRY CO., LTD.), aluminum hydroxide (HIGILITE H-42S produced by SHOWA DENKO) were used, other than metal phosphate (ExolitOP935) used in example 1. As the addition agent, carbodiimide compounds (V-05, V-07, V-09 produced by Nisshinbo Chemical) were used.

The solvent solubility of the adhesive agents 1 to 18 thus prepared was evaluated. The solvent solubility of the adhesive agents 1 to 18 was evaluated in such a manner that whether a base resin was dissolved in the mixed solvent, when the base resin was added therein so that a concentration of a solid content of the base resin was 10 wt %. Specifically, resin was added to the mixed solvent of the hydrocarbon solvent at a room temperature of 25° C. in which the mixing ratio of toluene and alcohol was in a range of 5:95 to 95:5, and a state that the resin is not dissolved was defined as failure (defect) in the solvent solubility. When the adhesive agents 1 to 18 were evaluated, it was found that the solvent solubility was successful, because the resin was dissolved in the mixed solvent.

Further, the heat resistance of the resin layer comprising the adhesive agents 1 to 18 was evaluated. The heat resistance was evaluated as follows. A flat aluminum plate was coated with the adhesive agent 1 for the intermediate adhesive layer, to thereby form a resin layer with a thickness of 25 μm. Then, a cylindrical aluminum bar with a length of a tip end part set to 3 mm and a diameter set to 1 mm was pushed into the resin layer from above so that a pressure of 1 MPa was added thereto, and this state was maintained for 24 hours in a temperature-controlled vessel at a temperature of 85° C. Then, the heat resistance of the resin layer was judged to be successful unless an electrical connection was made after 24 hours between the aluminum plate and the aluminum bar.

When the heat resistance of the resin layer made of the adhesive agent 1 was evaluated, it was found that this resin layer was excellent in the heat resistance. Similarly to the adhesive agent 1, measurement was performed regarding the adhesive agents 2 to 18 as well. Then, it was found that any one of these resin layers was excellent in the heat resistance.

Further, curl resistance of the resin layer made of the adhesive agents 1 to 18 was evaluated. Regarding the curl resistance, curl (warpage) of the resin layer made of the adhesive agents 1 to 18 described in table 1 was evaluated. A 5 cm-square PET film (with a thickness of 25 μm) was coated with the adhesive agents 1 to 18 so that a coating thickness was 30 μm, and the coating liquid was dried to thereby form the resin layer. Then, the evaluation of the curl resistance was judged to be successful unless the formed resin layer was curled to thereby cause contacts between opposite angles and opposite sides of the square PET film.

When the curl resistance of the resin layer made of the adhesive agents 1 to 18 was evaluated, as shown in table 1, although the resin layer was shrunk by crystallization due to drying, the stress due to the shrink was relaxed, and therefore the contact between the opposite angles and the opposite sides of the PET film was not confirmed. The above-mentioned evaluation results are shown in table 1.

Next, the coating liquid used for the adhesive layer formed on the intermediate adhesive layer was prepared. VYLON 670 (without melting point), VYLON 200 (without melting point) (produced by TOYOBO) which were polyester resin, were used for the base resin of the coating liquid of the adhesive layer. The base resin was dissolved in toluene, and further KISUMA 5L of the magnesium hydroxide being the non-halogen flame retardant (produced by Kyowa Chemical Industry Co., Ltd.) was added thereto, to thereby prepare the coating liquid of the adhesive layer (adhesive agent A). Preparing conditions of the adhesive agent A are shown in table 2. Further, similarly to the adhesive agent A, coating liquids having compositions B to D (adhesive agents B to D) shown in table 2 were prepared. The adhesive agents B to D were prepared similarly to the adhesive agent A, excluding a point that the resin composition thereof or the flame retardant, and the kind of the organic solvent were changed.

Similarly to the adhesive agents 1 to 18, when the solvent solubility of the base resin contained in the adhesive agents B to D was confirmed, it was found that excellent solvent solubility could be obtained in any one of these adhesive agents B to D as shown in table 2.

TABLE 2

| | | | Adhesive agent for adhesive layer | | | |
|---|---|---|---|---|---|---|
| | | | Composition A | Composition B | Composition C | Composition D |
| Base resin [pts. wt.] | Polyester | VYLON670 | 70 | — | — | 70 |
| | | VYLON200 | 30 | — | — | 30 |
| | Thermoplastic polyurethane | UR-1350 | — | 100 | — | — |
| | Copolyamide | TPAE32 | — | — | 100 | — |
| Flame retardant [pts. wt.] | Magnesium hydroxide | KISUMA5L | 50 | — | — | — |
| | 1,3,5-triazine derivative | MC-5S | — | 50 | — | — |
| | Metal phosphate | Exolit OP935 | — | — | 50 | — |

TABLE 2-continued

|  |  | Adhesive agent for adhesive layer | | | |
|---|---|---|---|---|---|
|  |  | Composition A | Composition B | Composition C | Composition D |
| Organic solvent [Ratio] | Toluene | 100 | — | 80 | 100 |
|  | Methylethylketone | — | 100 | — | — |
|  | Isopropylalcohol | — | — | 20 | — |
| Property evaluation | Solvent solubility | Excellent | Excellent | Excellent | Excellent |

Example 1

Subsequently, the adhesive film of example 1 was manufactured using the adhesive agent 1 for the intermediate layer and the adhesive agent A for the adhesive layer. In example 1, the PET film (. . . produced by TORAY) was used as the insulator film. A corona-treated surface of the PET film was coated with the adhesive agent 1 using a Slot Die Coater, and the surface was dried at a temperature of 120° C., to thereby form the intermediate adhesive layer with a thickness of 24 μm. The surface of the formed intermediate adhesive layer was coated with the adhesive agent A for the adhesive layer using the Slot Die Coater, and the surface was dried at a temperature of 120° C. and the adhesive layer with a thickness of 4 μm was formed, to thereby manufacture the adhesive film of example 1. Manufacturing conditions of the adhesive film are shown in table 3.

were prepared, and if all of the five flat cables were successful, it was judged as ◉, and if three to four flat cables were successful, it was judged as ○, and if one to two flat cables were successful, it was judged as Δ, and if all of them were failure, it was judged as X. It was found that all of the five flat cables of example 1 were successful, thus having excellent flame resistance.

Further, regarding the adhesiveness, 180°peel test (tensile speed: 50 cm/min) of the tin-plated rectangular conductor was performed for a terminal portion, to thereby measure and evaluate a peel strength. If the peel strength was 0.7 kN/m or more, it was judged as ◉, and if the peel strength was 0.6 kN/m or more and less than 0.7 kN/m, it was judged as ○, and if the peel strength was 0.5 kN/m or more and less than 0.6 kN/m, it was judged as Δ, and if the peel strength was less than 0.5 kN/m, it was judged as X. It was found that the flat cable

TABLE 3

|  |  | Example | | | | | | | | | | | | | | | | | |
|---|---|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 14 | 15 | 16 | 17 | 18 |
| Used adhesive agent | Adhesive layer | C. A | C. B | C. C | C. D | C. A | C. B | C. C | C. D | C. A | C. B | C. C | C. D | C. A | C. B | C. C | C. D | C. A | C. B |
|  | Intermediate adhesive layer | C. 1 | C. 2 | C. 3 | C. 4 | C. 5 | C. 6 | C. 7 | C. 8 | C. 9 | C. 10 | C. 11 | C. 12 | C. 13 | C. 14 | C. 15 | C. 16 | C. 17 | C. 18 |
| Insulator film | Thickness [μm] | 12 | 25 | 12 | 25 | 12 | 25 | 12 | 25 | 12 | 25 | 12 | 25 | 12 | 25 | 12 | 25 | 12 | 12 |
| Intermediate adhesive layer | Thickness [μm] | 24 | 36 | 24 | 36 | 24 | 36 | 24 | 36 | 24 | 36 | 24 | 36 | 24 | 36 | 24 | 36 | 24 | 24 |
| Adhesive layer | Thickness [μm] | 4 | 4 | 4 | 4 | 4 | 4 | 4 | 4 | 4 | 4 | 4 | 4 | 4 | 4 | 4 | 4 | 4 | 4 |
| Evaluation result | Adhesiveness | ◉ | ◉ | ◉ | ◉ | ◉ | ◉ | ◉ | ◉ | ◉ | ◉ | ◉ | ◉ | ◉ | ◉ | ◉ | ◉ | ○ | ○ |
|  | Flame resistance | ◉ | ○ | ◉ | ◉ | ◉ | ○ | ◉ | ◉ | ○ | ○ | ◉ | ○ | ◉ | ○ | ◉ | ◉ | ◉ | ◉ |

C. = Composition

Next, a flat cable was produced using the adhesive film. In this example, a tin-plated rectangular soft conductor with a width of 0.3 mm and a thickness of 35 μm was used as a conductor. Fifty conductors were arranged in parallel at a pitch of 0.5, and thereafter these conductors were arranged so that upper and lower surfaces are faced each other on the adhesive layers of a pair of adhesive films, which were then integrally laminated, to thereby manufacture the flat cable of this example.

The flame resistance and the adhesiveness of the manufactured flat cable were evaluated.

The flame resistance was evaluated by executing UL VW-1, based on UL758AWM. Specifically, five flat cables of example 1 had the peel strength of 0.7 kN/m or more, and had excellent adhesiveness. Evaluation results thereof are shown in table 3.

Examples 2 to 18

In examples 2 to 18, the adhesive film and the flat cable were produced similarly to example 1, excluding a point that a combination of the adhesive agent 1 of the intermediate adhesive layer and the adhesive agent A of the adhesive layer was changed in example 1. In manufacturing the adhesive film, as shown in table 3, the adhesive agents 2 to 18 for the intermediate adhesive layer, and the adhesive agents A to D for the adhesive layer, were suitably combined. Also, by suitably varying the film thickness of the intermediate adhesive layer and the adhesive layer, the adhesive film and the flat cable of examples 2 to 18 were manufactured.

When the flame resistance and the adhesiveness of the flat cable manufactured in examples 2 to 18 were evaluated similarly to example 1, as shown in table 3, it was found that any one of the flat cables of examples 2 to 18 had excellent flame resistance and adhesiveness. Note that in examples 1 to 18, there is a case that the flame resistance was different between ⊚ and ◯. This is because the ratio of the flame retardant with respect to flammables (such as insulator film and resin) per unit volume is different. Further, in examples 17 and 18, the adhesiveness is reduced compared with examples 1 to 16. This is probably because in the adhesive agent used for the intermediate adhesive layer, the mixing ratio of the crystalline resin and the non-crystalline resin, and the addition amount of the carbodiimide compound are different.

Comparative Examples 1 to 4

In comparative examples 1 to 4, the adhesive agent 1 for the intermediate adhesive layer of example 1 was simply changed to the adhesive agents having compositions 19 to 22 shown in table 4 (adhesive agents 19 to 22), and regarding the other condition, an adhesive film and a flat cable were manufctured similarly to example 1.

contains only copolyamide (TPAE32, having a melting point of 124° C. and produced by Fujikasei Kogyo) which is crystalline resin, as a base resin. The adhesive agent 19 was prepared by dissolving 100 pts.wt. of this resin into a mixed solvent of toluene and isopropyl alcohol (toluene:isopropyl alcohol=80:20). Similarly to example 1, when the solvent solubility of the adhesive agent 19 was examined, as shown in table 4, it was found that the base resin used for the adhesive agent 19 had the solvent solubility.

Further, when the heat resistance and the curl resistance of the resin layer made of the adhesive agent 19 were examined, it was found that this resin layer didn't have the curl resistance, although it has the heat resistance. This is because only the crystalline resin having a large shrink ratio is contained in the adhesive agent 19, and the formed resin layer is largely shrunk during drying. When the adhesive layer 19 is used for the adhesive film, warpage due to stress is generated in the insulator film, which is caused by the shrink of the adhesive agent 19, and the manufactured adhesive film is set in a curled state.

Further, the flat cable was manufactured from the adhesive film of comparative example 1, under conditions shown in table 5. Since the flat cable of comparative example 1 is produced using the adhesive film with a curl generated therein, this flat cable is curled, and therefore has an inferior outer appearance. Although the flat cable of comparative

TABLE 4

|  |  |  | Adhesive agent for intermediate adhesive layer | | | |
|---|---|---|---|---|---|---|
|  |  |  | C. 19 | C. 20 | C. 21 | C. 22 |
| Resin [pts. wt.] | Crystalline copolyamide | TPAE (melting point 124° C.) | 100 | — | — | — |
|  |  | PA100 (melting point 84° C.) | — | 80 | — | — |
|  |  | TPAE8 (melting point 153° C.) | — | — | 80 | — |
|  | Non-crystalline copolyamide | TPAE617 (without melting point) | — | 20 | 20 | 80 |
|  | Non-crystalline polyester | VYLON200 (without melting point) | — | — | — | 20 |
| Flame resistance [pts. wt.] | Metal phosphate | Exolit OP935 | 150 | — | — | — |
|  | Phosphate | FP2100J | — | 150 | — | — |
|  | Melamine polyphosphate | MELAPUR 200/70 | — | — | 150 | — |
|  | Melamine sulfate | APINON-901 | — | — | — | 95 |
| Additive agent [pts. wt.] | Carbodiimide | V-05 | 5 | — | — | — |
| Organic solvent [ratio] | Hydrocarbon based solvent | Toluene | 80 | 80 | — | 80 |
|  | Alcohol | Isopropyl alcohol | 20 | 20 | — | 20 |
| Property evaluation | Solvent solubility | | Excellent | Excellent | Defect | Excellent |
|  | Heat resistance | | Pass | Failure | Unconfirmed | Failure |
|  | Curl | | Failure | Pass | Unconfirmed | Pass |

C. = Composition

Comparative Example 1

In comparative example 1, an intermediate adhesive layer was produced by the coating liquid having composition 19 (adhesive agent 19) shown in table 4. The adhesive agent 19 example 1 has excellent flame resistance, the adhesiveness is slightly reduced. The reason for such a reduction of the adhesiveness is considered as follows. Namely, even if the adhesive films are laminated and stuck each other, adhesion to conductors, etc., is inhibited in a case of the curled adhesive film.

TABLE 5

|  |  | Comparative example | | | |
|---|---|---|---|---|---|
|  |  | 1 | 2 | 3 | 4 |
| Used adhesive agent | Adhesive layer | Composition A | Composition B |  | Composition D |
|  | Intermediate adhesive layer | Composition 19 | Composition 20 | Composition 21 | Composition 22 |
| Insulator film | Thickness [μm] | 12 | 25 |  | 25 |
| Intermediate adhesive layer | Thickness [μm] | 24 | 36 |  | 36 |
| Adhesive layer | Thickness [μm] | 4 | 4 |  | 4 |
| Evaluation result | Adhesiveness | ○ | ○ | Non-evaluation | ○ |
|  | Flame resistance | ⊚ | ○ | Non-evaluation | x |

Comparative Example 2

In comparative example 2, an intermediate adhesive layer was manufactured by the coating liquid of the composition 20 shown in table 4 (adhesive agent 20). The adhesive agent 20 was prepared by dissolving a mixed resin of 80 pts.wt. of crystalline copolyamide (PA100, having a melting point of 84° C. and produced by Fujikasei Kogyo) and 20 pts.wt. of non-crystalline copolyamide (TPAE617, without melting point and produced by Fujikasei Kogyo) into a mixed solvent of toluene and isopropyl alcohol (toluene:isopropyl alcohol=80:20). The carbodiimide compound was not added into the adhesive agent 20.

Similarly to example 1, when the solvent solubility of the adhesive agent 20 was examined, as shown in table 2, it was found that the base resin used for the adhesive agent 20 had the solvent solubility. Further, when the heat resistance and the curl resistance of the resin layer made of the adhesive agent 20 were examined, it was found that this resin layer had the curl resistance, but didn't have the heat resistance. This is because the melting point of the crystalline resin contained in the adhesive agent 20 is 84° C., which is lower than 100° C. Further, it was found that the flat cable manufactured from the adhesive film of comparative example 2 was inferior in the heat resistance, because the heat resistance of the used adhesive film itself was low.

Comparative Example 3

In comparative example 3, an intermediate adhesive layer was manufactured by the coating liquid having composition 21 (adhesive agent 21) shown in table 4. In the adhesive agent 21, the mixed resin of 80 pts.wt. of the crystalline copolyamide (TPAE8, having melting pint of 153° C. and produced by Fujikasei Kogyo) and 20 pts.wt. of the non-crystalline copolyamide (TPAE617 without melting point and produced by Fujikasei Kogyo) was dissolved into a solvent in which toluene and each kind of alcohol (methanol, ethanol, isopropyl alcohol) were mixed in a range of toluene:alcohols=95:5 to 5:95. However, the mixed resin was not dissolved into the mixed solvent, and the adhesive agent 21 could not satisfy the solvent solubility. The reason can be considered as follows. Namely, the melting point of the crystalline resin contained in the adhesive agent 21 is higher than 150° C., and there is much content of crystals in the resin, and therefore the crystal melting calorific value is high (about 40 J/g). In comparative example 3, the mixed resin could not be dissolved, thus making it impossible to form the intermediate adhesive layer. Therefore, the adhesive film and the flat cable were not manufactured.

Comparative Example 4

In comparative example 4, an intermediate adhesive layer was manufactured by the coating liquid having composition 22 (adhesive agent 22) shown in table 2. The adhesive agent 22 was prepared by dissolving a mixed resin of 80 pts.wt. of the non-crystaline copolyamide (TPAE617 without melting point and produced by Fujikasei Kogyo) and the non-crystaline polyester (VYLON 200, without melting point and produced by TOYOBO) into the mixed solvent of toluene and isopropyl alcohol (toluene:isopropyl alcohol=80:20) . The calbodiimide compound was not added into the adhesive agent 22.

Similarly to example 1, when the solvent solubility of the adhesive agent 22 was examined, as shown in table 2, it was found that the base resin used for the adhesive agent 22 had the solvent solubility. Also, when the heat resistance and the curl resistance of the resin layer made of the adhesive agent 22 were examined, it was found that this resin layer had the curl resistance, but didn't have the heat resistance. This is because only the non-crystalline resin having a low heat resistance was contained in the adhesive agent 22. Further, the flat cable manufactured from the adhesive film of comparative example 4 could not satisfy the flame resistance, because the content of the flame retardant was smaller than 100 pts.wt.

PREFERRED ASPECTS OF THE PRESENT INVENTION

Preferred aspects of the present invention will be described hereafter.

According to a first aspect of the present invention, there is provided an adhesive film, including:
an insulator film;
an adhesive layer formed on the insulator film; and
an intermediate adhesive layer interposed between the insulator film and the adhesive layer,
wherein the intermediate adhesive layer is made of a mixed resin composition of a copolyamide being a crystalline resin solvable in a non-halogen based organic solvent and having a melting point of 100° C. or more and 150° C. or less, and a non-crystalline resin, and the intermediate adhesive layer contains a non-halogen flame retardant by 100 pts.wt. or more and 250 pts.wt. or less with respect to 100 pts.wt. of the mixed resin composition.

Preferably, the intermediate layer further contains a carbodiimide compound.

Further preferably, a content of the non-crystalline resin is 10 pts.wt. or more and 80 pts.wt. or less, with respect to 100 pts.wt. of the copolyamide.

Further preferably, the copolyamide is solvable in a mixed solvent of a hydrocarbon solvent having a boiling point of 140° C. or less and alcohols.

Further preferably, the copolyamide is solvable in a mixed solvent of toluene and alcohols, or a mixed solvent of methylcyclohexane and n-propyl alcohol.

Further preferably, the adhesive layer contains a non-halogen flame retardant.

Further preferably, the non-halogen flame retardant contained in the adhesive layer is 5 pts.wt. or more and 100 pts.wt. or less with respect to 100 pts.wt. of resin constituting the adhesive layer.

Further preferably, the non-halogen flame retardant is one kind or more flame retardant selected from a group consisting of a phosphorus compound, a nitrogen compound, and a metal compound.

Further preferably, the adhesive layer comprises a resin solvable in a non-halogen based organic solvent with a boiling point of 120° C. or less.

Further preferably, thickness Ta of the insulator film, thickness Tb of the adhesive layer, and thickness Tc of the intermediate adhesive layer satisfy a relation of Tc>Ta>Tb.

Further preferably, the insulator film is a polyethylene terephthalate film with a thickness of 9 μm or more and 35 μm or less.

According to other aspect of the present invention, a pair of the adhesive films described in the first aspect are integrally formed by adhesion, with a plurality of conductors arranged in parallel on planes, interposed from both surfaces.

What is claimed is:

1. An adhesive film, consisting of:
   an insulator film;
   an adhesive layer formed on the insulator film, the adhesive layer made of a material containing any one of resins of polyester, thermoplastic polyurethane, and copolyamide; and
   an intermediate adhesive layer interposed between the insulator film and the adhesive layer,
   wherein the intermediate adhesive layer is made of a material containing a mixed resin composition, the mixed resin composition consisting of a copolyamide and a non-crystalline resin;
   wherein the copolyamide is a crystalline resin solvable in a non-halogen based organic solvent and having a melting point of 100° C. or more and 150° C. or less, and the non-crystalline resin consists of a non-crystalline copolyamide or non-crystalline polyester;
   wherein a content of the non-crystalline resin is 10 pts. wt. or more and 80 pts. wt. or less, with respect to 100 pts. wt. of the copolyamide; and
   wherein the intermediate adhesive layer contains a non-halogen flame retardant by 100 pts. wt. or more and 250 pts. wt. or less with respect to 100 pts. wt. of the mixed resin composition.

2. The adhesive film according to claim 1, wherein the copolyamide is solvable in a mixed solvent, the mixed solvent including i) a hydrocarbon solvent having a boiling point of 140° C. or less and ii) alcohols.

3. The adhesive film according to claim 2, wherein the mixed solvent includes toluene and alcohols, or methylcyclohexane and n-propyl alcohol.

4. The adhesive film according to claim 1, wherein the non-halogen flame retardant is at least one of a flame retardant selected from the group consisting of a phosphorous compound, a nitrogen compound, and a metal compound.

5. The adhesive film according to claim 1, wherein the resin of the adhesive layer is solvable in a non-halogen based organic solvent having a boiling point of 120° C. or less.

6. The adhesive film according to claim 1, wherein thickness Ta of the insulator film, thickness Tb of the adhesive layer, and thickness Tc of the intermediate adhesive layer satisfy a relation of Tc>Ta>Tb.

7. The adhesive film according to claim 1, wherein the insulator film is a polyethylene terephthalate film having a thickness of 9 μm or more and 35 μm or less.

8. A flat cable comprising:
   a pair of the adhesive films according to claim 1 integrally formed by adhesion; and
   a plurality of conductors arranged in parallel on planes interposed between adhesive films of the pair.

9. The adhesive film according to claim 1, wherein the copolyamide of the mixed resin composition is a crystalline copolyamide, the non-crystalline resin of the mixed resin composition is a non-crystalline copolyamide, and the material of the adhesive layer contains polyester.

10. The adhesive film according to claim 1, wherein the copolyamide of the mixed resin composition is a crystalline copolyamide, the non-crystalline resin of the mixed resin composition is a non-crystalline copolyamide, and the material of the adhesive layer contains polyurethane.

11. The adhesive film according to claim 1, wherein the copolyamide of the mixed resin composition is a crystalline copolyamide, the non-crystalline resin of the mixed resin composition is a non-crystalline copolyamide, and the material of the adhesive layer contains a copolyamide.

12. The adhesive film according to claim 1, wherein the copolyamide of the mixed resin composition is a crystalline copolyamide, the non-crystalline resin of the mixed resin composition is a non-crystalline polyester, and the material of the adhesive layer contains polyester.

13. The adhesive film according to claim 1, wherein the copolyamide of the mixed resin composition is a crystalline copolyamide, the non-crystalline resin of the mixed resin composition is a non-crystalline polyester, and the material of the adhesive layer contains thermoplastic polyester.

14. The adhesive film according to claim 1, wherein the copolyamide of the mixed resin composition is a crystalline copolyamide, the non-crystalline resin of the mixed resin composition is a non-crystalline polyester, and the material of the adhesive layer contains a copolyamide.

15. An adhesive film, comprising:
   an insulator film;
   an adhesive layer formed on the insulator film, the adhesive layer made of a material containing any one of resins of polyester, thermoplastic polyurethane, and copolyamide; and
   an intermediate adhesive layer interposed between the insulator film and the adhesive layer,
   wherein the intermediate adhesive layer is made of a material containing a mixed resin composition, the mixed resin composition consisting of a copolyamide and a non-crystalline resin;
   wherein the copolyamide is a crystalline resin solvable in a non-halogen based organic solvent and having a melting point of 100° C. or more and 150° C. or less, and the non-crystalline resin consists of a non-crystalline copolyamide or non-crystalline polyester, wherein a content of the non-crystalline resin is 10 pts. wt. or more and 80 pts. wt. or less, with respect to 100 pts. wt. of the copolyamide; and wherein the intermediate adhesive layer contains a non-halogen flame retardant by 100 pts. wt. or more and 250 pts. wt. or less with respect to 100 pts. wt. of the mixed resin composition.

16. The adhesive film according to claim 15, wherein the intermediate adhesive layer further comprises a carbodiimide compound.

17. The adhesive film according to claim 15, wherein the adhesive layer further comprises a non-halogen flame retardant.

18. The adhesive film according to claim 17, wherein the non-halogen flame retardant is 5 pts. wt. or more and 100 pts. wt. or less with respect to 100 pts. wt. of the resin of the adhesive layer.

19. The adhesive film according to claim 15, wherein the copolyamide of the mixed resin composition is a crystalline copolyamide, the non-crystalline resin of the mixed resin composition is a non-crystalline copolyamide, and the material of the adhesive layer contains polyester, polyurethane, or a copolyamide.

20. The adhesive film according to claim 15, wherein the copolyamide of the mixed resin composition is a crystalline copolyamide, the non-crystalline resin of the mixed resin composition is a non-crystalline polyester, and the material of the adhesive layer contains polyester, thermoplastic polyester, or a copolyamide.

\* \* \* \* \*